Figure 10:
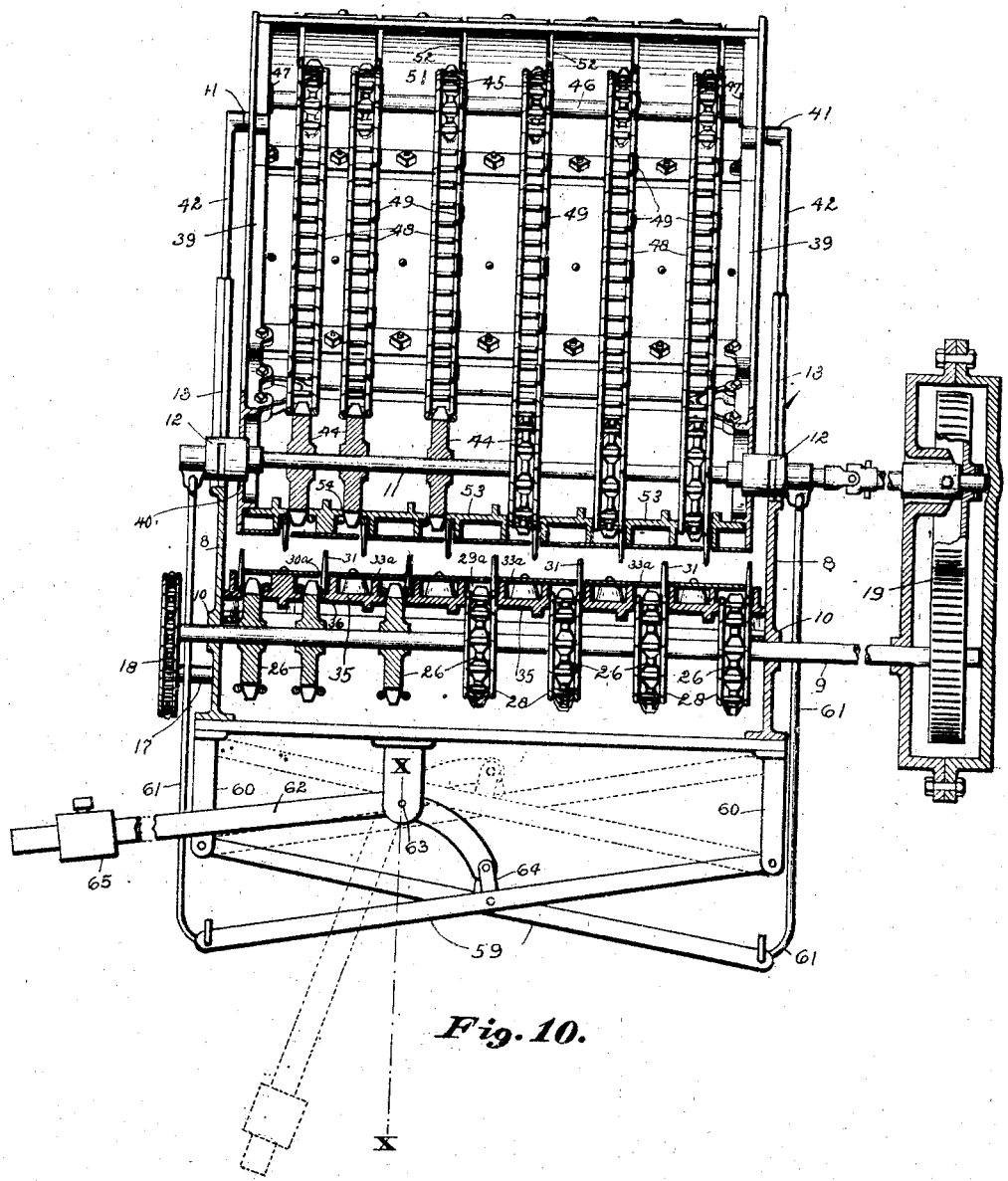

No. 883,392. PATENTED MAR. 31, 1908.
J. DICK.
FODDER CUTTER.
APPLICATION FILED JULY 9, 1907.
4 SHEETS—SHEET 1.
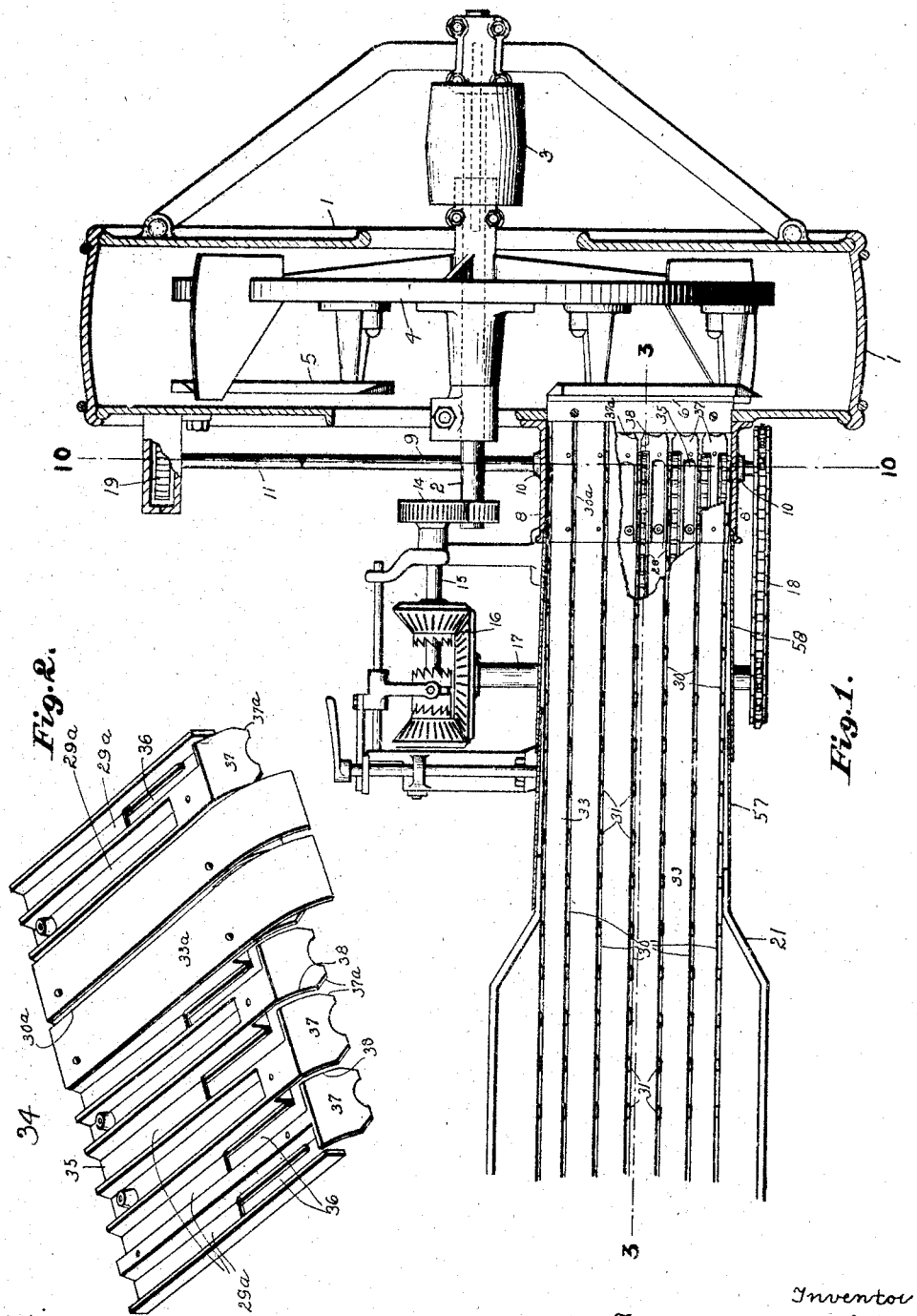
Witnesses
Harry O. Rastetter
Mary A. Cavanaugh
Inventor
Joseph Dick.
By Harry Frease
Attorney No. 883,392. PATENTED MAR. 31, 1908.
J. DICK.
FODDER CUTTER.
APPLICATION FILED JULY 9, 1907.
4 SHEETS—SHEET 2.
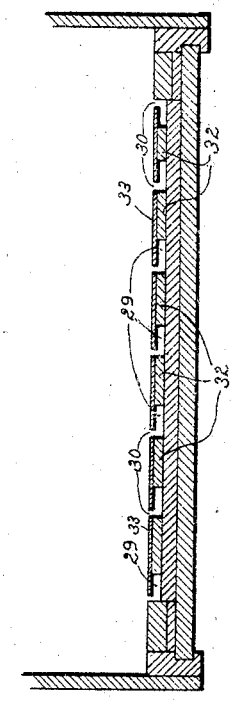
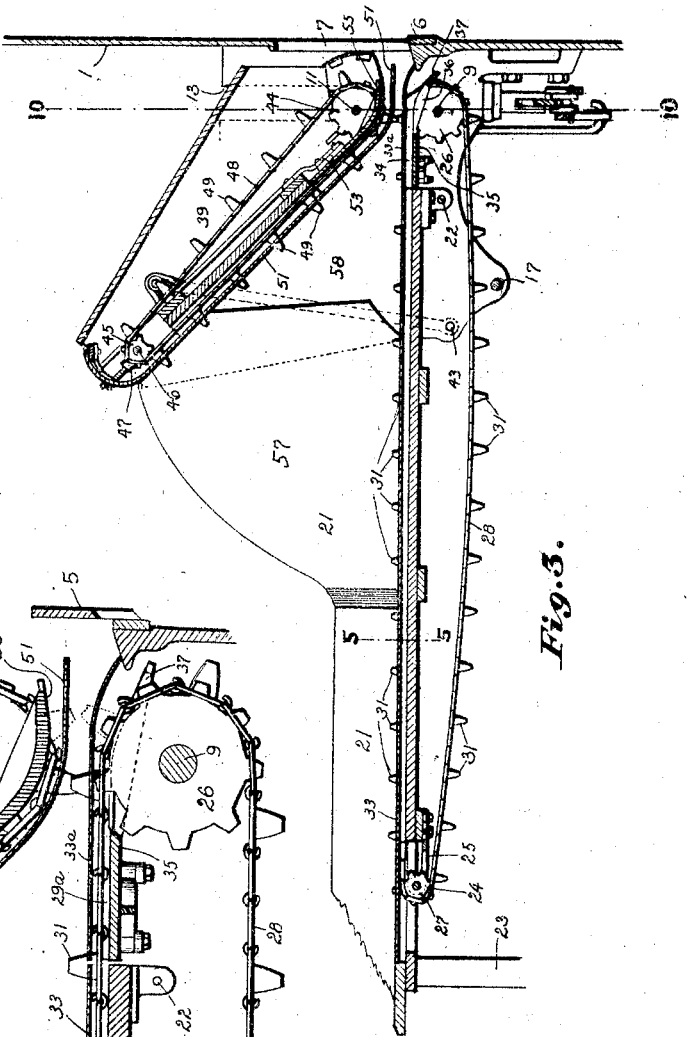
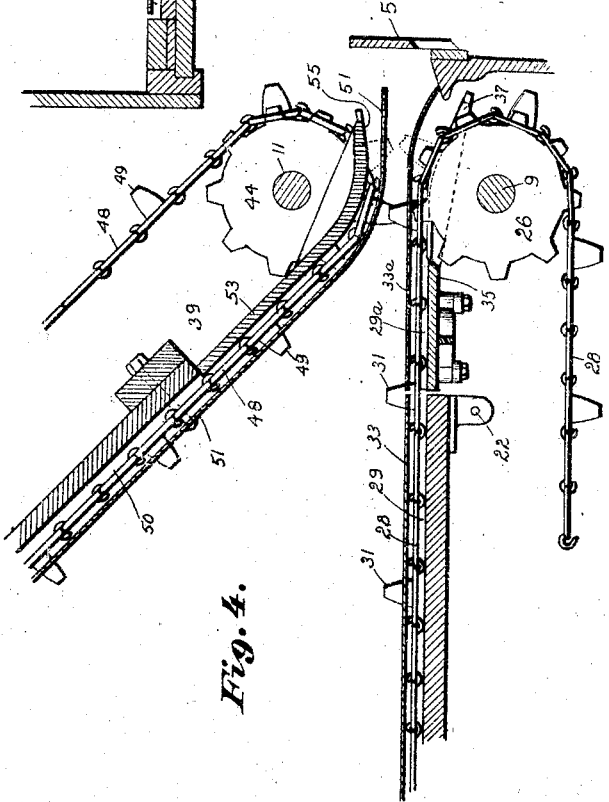
Witnesses
Harry O. Rastetter
Mary A. Cavanaugh
Inventor
Joseph Dick.
By Harry Frease.
Attorney

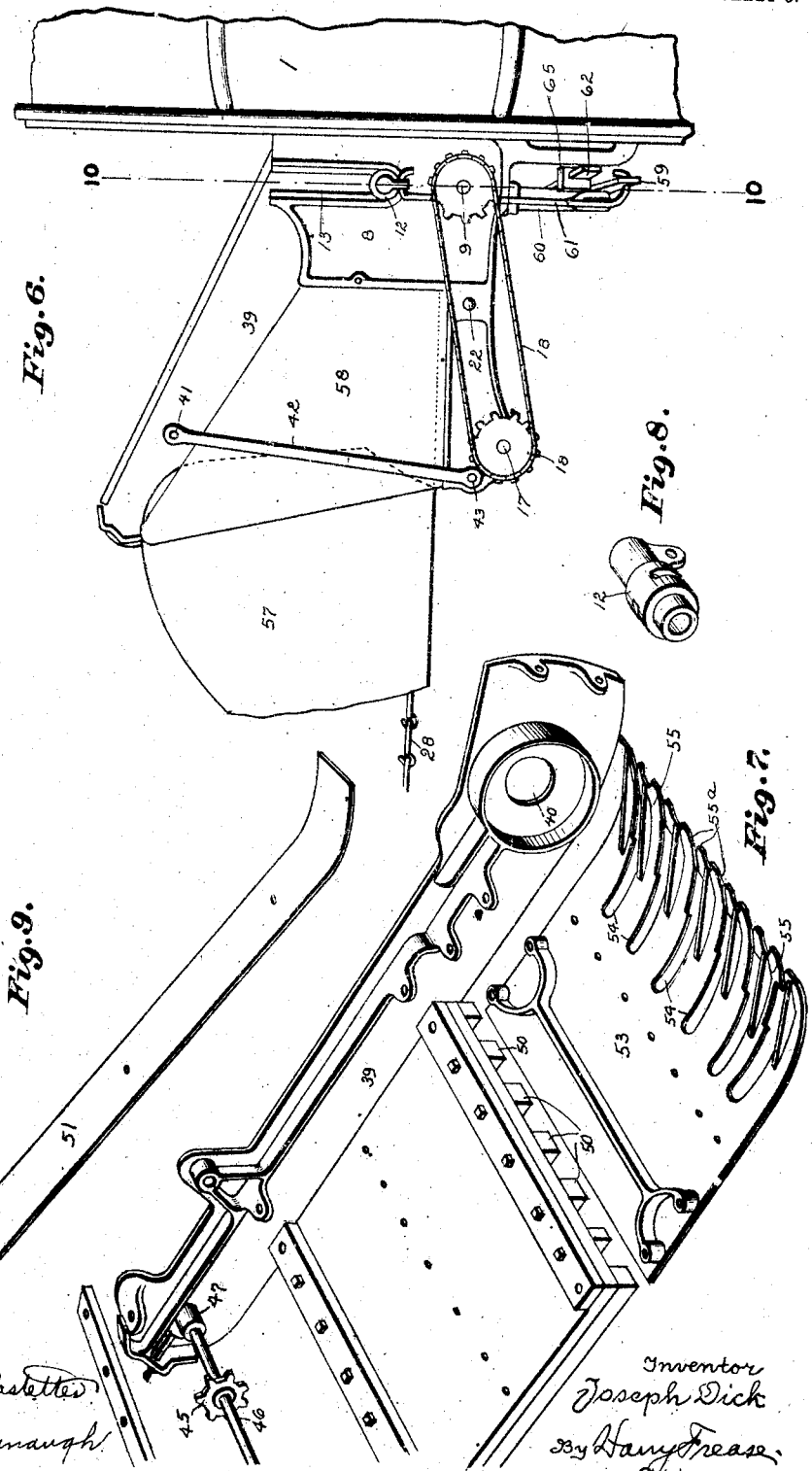

UNITED STATES PATENT OFFICE.

JOSEPH DICK, OF CANTON, OHIO.

FODDER-CUTTER.

No. 883,392.  Specification of Letters Patent.  Patented March 31, 1908.

Original application filed April 28, 1906, Serial No. 314,142. Divided and this application filed July 9, 1907.

Serial No. 382,964.

*To all whom it may concern:*

Be it known that I, JOSEPH DICK, a citizen of the United States, residing at Canton, in the county of Stark and State of Ohio, have invented a new and useful Improvement in Fodder-Cutters, of which the following is a specification.

My invention relates to the feed mechanism in machines for cutting forage, and especially for cutting alfalfa and other similar plants having comparatively tender, weak and limber stems which are inclined to become tangled and bunched together and also to be broken by reason of their brittleness when not properly handled and controlled; and the object of the invention is to provide a feed mechanism which will receive the alfalfa in its natural and ordinary loose condition and to positively and forcefully convey and feed the same to the shearing knives of the cutting machine in a compressed condition for the proper action of the cutting machine. This object is attained by the construction, mechanism and arrangement illustrated in the accompanying drawings, in which—

Figure 1 is a sectional plan of a fodder cutter and feed trough, with the counter-conveyer removed, showing the general arrangement of the parts; Fig. 2, a detached perspective view showing details of the lower plate of the hopper throat; Fig. 3, a longitudinal section of the feed mechanism on line 3—3, Fig. 1; Fig. 4, an enlarged longitudinal section showing the throat of the feed hopper; Fig. 5, a transverse section of the conveyer-trough on line 5—5, Fig. 3; Fig. 6, a fragmentary side elevation of the feed hopper and part of the fodder cutter case; Fig. 7, a detached perspective view showing details of the frame of the counter-conveyer; Fig. 8, a detached perspective view of one counter feed-shaft bearing; Fig. 9, a detached perspective view of one sheet-strip forming the face of the counter-conveyer; and Fig. 10, a transverse vertical section of the feed hopper on line 10—10, Figs. 1, 3 and 6; with the cover of the counter-conveyer frame removed.

Similar numerals refer to similar parts throughout the drawing.

The fodder-cutter proper comprises the case 1, having journaled axially therein the main shaft 2, on which shaft is securely mounted the drive pulley 3 located on the rear side of the case, and the knife disk 4 located inside the case, to which disk are securely attached the cutting knives 5, which knives are adapted to operate as shears against the cutting bar 6 transversely located in the lower side of the feed aperture 7 formed in the forward wall of the case. These parts are of the character usually employed in fodder cutters of the type employed for illustrating the feed mechanism and do not form any part of this invention.

The feed-frame is formed or attached on the forward side of the case and comprises the vertical plates 8 located on each side of the feed aperture in the wall of the case. The main feed-shaft 9 is transversely journaled in the relatively fixed bearings 10 provided in the walls of the feed-frame; and the counter feed-shaft 11 is transversely journaled in the adjustable bearings 12, which bearings are located in the vertical slots 13 formed in the side plates of the feed-frame, in which slots these bearings are adapted to operate toward and from the main feed-shaft.

Power is communicated to the main feed-shaft from the main shaft by means of the cog gearing 14, the longitudinal counter shaft 15, the reversing bevel gearing 16, the transverse counter shaft 17 and the sprocket gearing 18; and power is communicated to the counter feed-shaft from the main feed-shaft by means of the cog-gearing 19, and the counter feed-shaft is suitably jointed, as shown at 20, to permit its vertical movements in the slots of the feed frame. These various gearings and shafts are mounted in suitable bearings formed or attached on the frame of the machine and form no part of this invention; the main and counter-shafts corresponding to the shafts for the lower and upper feed-rolls usually employed in fodder cutters of the type employed for illustration.

The rear end of the feed trough 21 is connected with the feed-frame, and is preferably hinged thereto, as by the pivots 22, which permits a slight vertical adjustment of the forward end of the feed trough which preferably rests on legs as 23. The idle shaft 24 is transversely journaled in the adjustable bearings 25 in the forward part of the feed trough, and the sprocket wheels 26 and 27 for the main sprocket conveyer 28 are securely mounted respectively on the main feed-shaft 9 and the idle-shaft 24. The longitudinal channels 29 are formed in the bottom of the feed trough for the operation of the sprocket chains, and the longitudinal slits 30 are also provided in the bottom, through which slits the teeth 31 of the sprocket chain are adapted to protrude upward above the bottom of the feed trough, as best shown in Fig. 3. The channels and slits are preferably made by means of the longitudinal wooden strips 32 which are spaced apart in the bottom of the feed trough, on which strips are securely attached the longitudinal sheet-metal strips 33 which partly overlap the longitudinal spaces between the wooden strips. These sheet-metal strips form hard and smooth surfaces which give little resistance to the movement of the alfalfa thereon.

The lower throat-plate 34 of the feed-hopper is formed or attached in the feed frame at the rear end of the bottom of the feed-trough and forms a continuation thereof to the cutter-bar of the fodder cutter. This plate is preferably made of the casting 35 in which is formed the channels 29$^a$ for the sprocket chain and the sheet metal strips 33$^a$ which are spaced apart to form the slits 30$^a$ for the teeth of the sprocket chain. The longitudinal slots 36 are provided in the casting through which the sprocket wheels 26 are adapted to protrude, and at the rear end of the casting are provided the downwardly inclined guides 37 spaced apart to form the longitudinal slits 38 in which slits the sprocket teeth are adapted to be guided after they have been withdrawn from the slits 30$^a$ between the sheet-metal strips by the rotation of the sprocket chains around the main sprocket wheels. The rear edges of the guide are tapered away from each other, as at 37$^a$, thus forming V-shaped entrances to the slits, by means of which the teeth of the sprocket are surely guided into the guide 38 and thereby into the longitudinal slits 30$^a$ in case the rotation of the sprocket conveyer is reversed.

The frame 39 of the counter-conveyer is pivoted at its rear end on the bearings 12 of the counter feed-shaft, as by means of apertures as 40 in the sides of the frame. The counter-conveyer frame is also pivoted at each side at or near its forward end, as at 41, to the upper ends of the rock links 42; the lower ends of which links are pivoted to the sides of the feed frame, as at 43; which connections permit the forward end of the counter-conveyer to oscillate sufficiently to accommodate the vertical movements of the rear end caused by the operation of the bearings 12 of the counter feed-shaft in the slots 13 of the feed-frame.

The sprocket-gearings for the counter-conveyer are composed of the sprocket-wheels 44 securely mounted on the counter feed-shaft 11, the sprocket wheels 45 mounted on the transverse idle-shaft 46 which is mounted in the adjustable bearings 47 in the forward end of the counter-conveyer frame, and the conveyer-chains 48 which are provided with the teeth 49. The longitudinal guides 50 are provided in the frame of the counter-conveyer, between which guides the sprocket chains are adapted to operate, and the face of the frame is composed of the longitudinal sheet-metal strips 51 slightly spaced apart to form the longitudinal slits 52 through which the teeth of the sprocket chains are adapted to protrude. The upper throat-plate of the feed hopper is preferably composed of the casting 53 and the forward ends of the sheet-metal face-strips 51. The casting 53 is formed or attached in the counter-conveyer frame and is provided at its rear end with the slots 54 through which the counter sprocket-wheels 44 are adapted to protrude. The rear end of this casting is curved or inclined rearward and upward to form the guides 55, spaced apart to form the slits 56, and having their rear edges tapered, as at 55$^a$, to form V-shaped entrances to these slits to properly guide the sprocket teeth as described for the main conveyer sprocket-teeth. The rear ends of the sheet-metal face-strips 51 of the counter-conveyer are extended rearward to a point opposite the rear ends of the similar face-strips of the main conveyer and adjacent to the cutter-bar 6 of the fodder cutter.

The counter-conveyer is inclined downward from its forward to its rear end and its rear end is normally located with its face-plate quite close to the adjacent face-plate of the main-conveyer, thus forming between the main and counter-conveyers a hopper having a wide mouth at the forward end and converging to a constricted throat at its rear end. The sides 57 of the feed trough are extended upward and rearward and are overlapped by the sides 58 which are formed or attached on the sides of the feed frame, thus forming the sides of the feed-hopper. The normal position of the counter-conveyer is with the bearings 12 for the counter-shaft resting in the lower ends of the guide-slots 13, as shown in the various figures of the drawings. And it is preferred to arrange the sprocket-chains so that the teeth of the counter-conveyer will come between the teeth of the main-conveyer, as shown in Fig. 10.

The alfalfa is placed in the feed-trough on the teeth of the main-conveyer, which carry it rearward into the hopper wherein the upper side of the alfalfa is engaged by the teeth of the counter-conveyer. The alfalfa is thus fed toward the throat of the hopper by the movement of the sprocket teeth, and in so doing slides on the comparatively smooth metallic faces of the conveyers, without any considerable resistance. In this operation the rear end of the counter-conveyer is raised by the alfalfa, according to the quantity being fed into the machine, and the throat of the hopper is enlarged sufficiently to permit the alfalfa to pass through to the cutting knives. The sprocket-teeth, above and below, continue in engagement with the alfalfa until the same has passed entirely through the constricted throat of the hopper, whereupon the teeth are withdrawn by the rotation of the sprocket chains around the wheels. The rearwardly extended ends of the sheet-metal face-strips of the conveyers hold the alfalfa while the teeth are being withdrawn from it: and the extended ends of the sheet-metal face-strips of the main conveyer are preferably somewhat diverged from the extended portions of the face-strips of the counter conveyer, which slightly enlarges the throat of the hopper towards the cutters, so that there is practically no resistance to the movement of the alfalfa after it has passed the more constricted part of the throat until it has reached the shearing knives of the cutting machine.

By reason of the weak and tender character of the alfalfa it is practically necessary that the weight of the counter-conveyer should not rest on it when there is only a small quantity in the throat of the hopper; but it is desirable that the pressure of the upper conveyer should increase as the bulk of alfalfa in the throat of the hopper increases. This desired result is accomplished by counter-balancing the rear end of the counter-conveyer in a variable manner, as by means of the weight and levers shown in Fig. 10. The transverse levers 59 are pivoted at one end to the brackets 60 formed or attached on the under side of the feed-frame, and at the other end these levers are pivotally connected with the lower ends of the link rods 61, the upper ends of which rods are connected with the bearings 12 of the counter feed-shaft. The balancing lever 62 is pivoted as at 63 to the lower side of the feed-frame at one side of the middle line thereof, and at the inner end is connected by the links 64 with the transverse levers at or near the middle thereof. The adjustable weight 65 is attached on the outer free end of the balancing lever, and the parts are so arranged and adjusted that when the balancing lever is at or near a horizontal position, the weight thereon will approximately balance the counter-conveyer when it is in its lowest position, as shown in the several views of the drawings. It is evident that as the counter-conveyer is elevated by the pressure of the alfalfa, the weighted end of the balancing lever will gravitate downward, and as it approaches the vertical line $x$—$x$ passing through the fulcrum pivot of the lever, its counter-balancing effect will gradually lessen, so that the pressure of the weight of the counter-conveyer on the alfalfa will likewise increase.

What I claim as my invention, and desire to secure by Letters Patent, is—

1. A feed-hopper for a forage-cutter and the like comprising opposed-faced variably-balanced separable conveyers having longitudinal slits therein, the faces being converged to form a constricted throat and thence diverged toward the cutters, and teeth protruded through the slits and adapted to be operated toward and through the constricted throat and to be withdrawn into the slits in the diverged parts of the faces.

2. A feed-hopper for a forage-cutter and the like comprising opposed-faced variably-balanced separable conveyers having longitudinal slits therein, the faces being converged to form a throat and thence extended toward the cutters, and teeth protruded through the slits and adapted to operate toward and through the beginning of the throat and to be withdrawn into the slits in the extended parts of the faces.

3. A feed-hopper for a forage-cutter and the like comprising opposed-faced conveyers adapted to be adjusted apart and having longitudinal slits therein, the faces being converged to form a constricted throat and thence diverged toward the cutters, and teeth protruded through the slits and adapted to be operated toward and through the constricted throat and to be withdrawn into the slits in the diverged parts of the faces.

4. A feed-hopper for a forage-cutter and the like comprising opposed-faced conveyers adapted to be adjusted apart and having longitudinal slits therein, the faces being converged to form a throat and thence extended toward the cutters, and teeth protruded through the slits and adapted to operate toward and through the beginning of the throat and to be withdrawn into the slits in the extended parts of the faces.

5. A feed-hopper for a forage-cutter and the like comprising opposed-faced conveyers having longitudinal slits therein, the faces being converged to form a constricted throat and thence diverged toward the cutters, and teeth protruded through the slits and adapted to be operated toward and through the constricted throat and to be withdrawn into the slits in the diverged parts of the faces.

6. A feed-hopper for a forage-cutter and the like comprising opposed-faced conveyers having longitudinal slits therein, the faces being converged to form a throat and thence extended toward the cutters, and teeth protruded through the slits and adapted to operate toward and through the beginning of the throat and to be withdrawn into the slits in the extended parts of the faces.

7. In a hopper composed of converging sprocket-chain conveyers, a face-plate having longitudinal-slits therein adapted to receive the chain-teeth, a guide-plate having slots therein adapted to receive the sprocket-wheels and forwardly extending slits adapted to receive the sprocket-wheels and forwardly extending slits adapted to receive and guide the chain-teeth, the guide-slits having their forward edges tapered to form V-shaped entrances to the slits.

8. In a hopper composed of converging sprocket-chain conveyers, a face-plate having longitudinal-slits therein adapted to receive the chain-teeth, a guide-plate under the face-plate and adjacent to the outer-sides of the sprocket-wheels, there being longitudinal slits in the guide-plate adapted to receive and guide the chain-teeth, and the guide-slits having their forward edges tapered to form V-shaped entrances to the slits.

JOSEPH DICK.

Witnesses:
F. J. DICK,
C. F. DICK.